United States Patent

[11] 3,607,297

| [72] | Inventor | Osvaldo Fasano<br>Strada Viciniale Prato del Lupo Frazione<br>Corbiglia, Villarbasse, (Turin), Italy |
|---|---|---|
| [21] | Appl. No. | 814,878 |
| [22] | Filed | Mar. 13, 1969 |
| [45] | Patented | Sept. 21, 1971 |
| [32] | Priority | Mar. 2, 1967 |
| [33] | | Italy |
| [31] | | 50746-A/67<br>Continuation-in-part of application Ser. No. 648,646, Jan. 26, 1967, now abandoned. |

[54] METHOD FOR PRODUCING BEVERAGES
4 Claims, 3 Drawing Figs.

[52] U.S. Cl. .................................................. 99/28,
99/71, 99/77, 99/295
[51] Int. Cl. ............................................... A47j 31/02,
A47f 31/40

[50] Field of Search........................................... 99/28, 71,
287, 77.1, 295, 171 I; 137/68

[56] References Cited
UNITED STATES PATENTS

| 3,472,284 | 10/1969 | Hosek | 137/68 |
| 2,778,739 | 1/1957 | Rooth | 99/171 I |
| 2,899,886 | 8/1959 | Rooth | 99/295 |
| 2,968,560 | 1/1961 | Goros | 99/77.1 |

*Primary Examiner*—Frank W. Lutter
*Assistant Examiner*—William L. Mentlik
*Attorney*—Young & Thompson

ABSTRACT: A relatively large quantity of a liquid is passed through a relatively small quantity of beverage-producing substance disposed in a pocket between two foils. Two conduits grasp the foils between them in endwise abutting sealed relationship, with the pocket within the conduits. One foil is weaker than the other, so as to be ruptured by the pressure of the liquid.

PATENTED SEP 21 1971 3,607,297

INVENTOR
OSVALDO FASANO
By Irwin S. Thompson
ATTY.

METHOD FOR PRODUCING BEVERAGES

This application is a continuation-in-part of my application Ser. No. 648,646, filed June 26, 1967 and now abandoned.

The present invention relates to methods for producing beverages, of the type in which a relatively large quantity of liquid is passed through a relatively small quantity of beverage-producing substance. The liquid may be hot or cold, and may be plain water or any aqueous solution or suspension. The beverage-producing substance may be liquid or solid, and may undergo dissolution or steeping or even chemical reaction, in contact with the liquid.

Among the objects of the invention are the provision of methods for preparing beverages, in which the substance to be contacted with the liquid can be kept out of contact with air and contamination or deterioration, or guarded against loss of volatile substances, until the instant of use.

Another object is to ensure cleanliness. Still another object is to make sure that the substance to be contacted with liquid is the original substance and is not adulterated in any way. Finally, it is an object to provide for the rapid and easy and inexpensive production of beverages even by unskilled people or children.

Other objects and advantages of the present invention will become apparent from a consideration of the following description, taken in connection with the accompanying drawing, in which.

Figure 1:
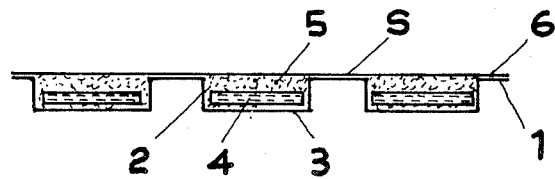
FIG. 1 is a cross-sectional edge view of a product according to the present invention.
Figure 2:
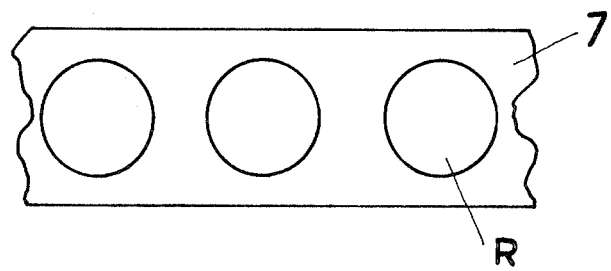
FIG. 2 is a bottom plan view of the product of FIG. 1.

Referring now to the drawing in greater detail, there is shown in FIGS. 1 and 2 the product of the invention, comprising a strip S comprised by a pair of foils 1 and 6 which may be of aluminum or plastic or other air-impervious material, but which in certain instances may be of air and/or liquid-pervious material. The lower foil 1 is formed as by stamping or drawing, with a plurality of cylindrical pockets R. The foils 1 and 6 are hermetically sealed together between the pockets R, as by heat bonding or adhesion or the like. If desired, the substance in pockets R may be vacuum packed by conventional methods.

In each pocket R there is disposed a relatively small quantity of a substance 2 to be contacted by relatively large quantity of liquid, for the production of the desired beverage. As indicated above, the substance 2 may be solid or liquid, and in the illustrated embodiment it is a powder. Examples of liquid substance 2 are beverage concentrates such as coffee concentrate and the like, or syrups. Examples of powdered or particulate substance 2 are coffee, tea, cocoa, chocolate, medicinals, and the like.

Disposed between the substance 2 and the bottom wall 3 of the pocket R is a small circular sheet 4 of a filter material such as paper fiber or fine mesh or the like. If the foils 1 and 6 are themselves liquid pervious, as in the case of a finely woven or fine meshed substance, then the separate filter 4 can be omitted. Alternatively, the foil 1 and the filter 4 can be replaced by a filter strip of a shape similar to that of foil 1.

As seen best in FIG. 2, therefore, there is thus provided a continuous series 7 or pockets R integrally interconnected by the foils 1 and 6 but sealed from each other and from the atmosphere in the illustrated embodiment.

Figure 3:
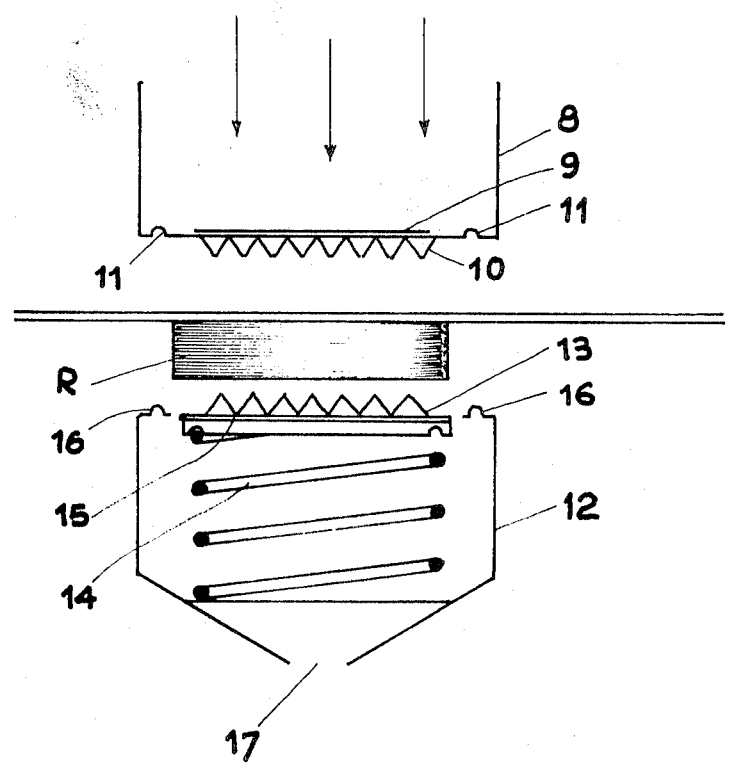
FIG. 3 is a schematic view of apparatus according to the present invention, in use in the practice of the method of the present invention in connection with the product of the present invention.

The apparatus for utilizing the product of FIGS. 1 and 2 is illustrated in FIG. 3 and the corresponding method is also there indicated. As is seen in FIG. 3, the apparatus comprises an upper conduit 8 having its bottom wall formed by a perforated plate 9 which supports, with the side walls of the conduit, a plurality of piercing teeth 10. The lower end of conduit 8 is encompassed by an annular series of indentations 11, which may alternatively be a continuous annular groove.

A lower conduit 12 is also provided, which is coaxial with conduit 8 and which may if desired be mounted for coaxial movement toward and away from conduit 8 by means of mounting and guide means (not shown). Conduit 12 is provided with a plurality if upwardly extending piercing teeth 13, which are urged upwardly by a coil compression spring 14 that acts on the underside of a plate 15 that carries the teeth 13. The position of teeth 13 in FIG. 3 is the fully extended position of the teeth; and it will be seen that the teeth may be yieldably urged downwardly from their FIG. 3 position, against the action of spring 14.

An annular series of projections 16 about the upper edge of conduit 12 matches and mates with and interfits in the recesses 11 of conduit 8. Of course, if the recesses 11 are in the form of a continuous groove, then the projections 16 will also be in the form of a continuous flange or ridge. Conduit 12 terminates downwardly in converging sidewalls and an opening 17 by which liquid may be dispensed into a suitable portable receptacle (not shown).

In operation, the parts are brought together in the direction shown by the arrows in FIG. 3, with the two conduits 8 and 12 in coaxial endwise abutting relationship and the projections 16 in registry with the recesses 11. However, a strip S is disposed between the conduits 8 and 12, and a pocket R of the strip S is disposed within the conduits. The projections 16 and recesses 11 grip between them the foils 1 and 6 outside the pocket R in sealing relationship, in the manner of a gasket. At the same time, the teeth 10 and 13 penetrate the foils 6 and 1, respectively, thereby breaking the seal of the pocket R. The spring 14 yields against the resistance of the material in pocket R, so that the lower teeth 13 are spaced a suitable distance from the upper teeth 10, depending on the depth of the pocket R, with the result that the foils are penetrated by the teeth but the overall integrity of the pocket is maintained. At the same time, the teeth 13 yield under the pressure of the pocket R, so that sealing between the abutting ends of conduits 8 and 12 is facilitated.

In the position of the parts just described, with the conduits fully brought together in sealing relationship and the axis of the conduits vertical, the liquid is poured in to the conduit 8, which for this purpose is open-topped. The liquid moves by gravity through the pierced foils and through the material in pocket R and through the filter 4, which is downstream of the said substance with regard to the direction of liquid flow, and then passes through the conduit 12 and emerges from the opening 17 into the provided receptacle.

The operation can be repeated simply by moving the conduits 8 and 12 apart and advancing strip S S one step so that a fresh pocket R is in position to produce a second portion of beverage.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the scope of the invention, as those skilled in this art will readily understand. For example, pocket R may be of a depth to contain two or more filtering wafers, each one supporting a layer of particulate material, thereby to produce beverages from substances that interact with each other, or to produce mixed drinks such as coffee and cream, or the like; and instead of using an elongated strip S, it is of course possible to provide individual packets characterized each by one pocket R. Also, variations may be made in the shape and arrangement of the teeth 10 and 13.

It is also possible to eliminate the sheet 4 of filter material, by making the pierced holes so small that they themselves serve as a filter. Also, the filter can be retained but moved outside the unit shown in FIGS. 1 and 2, or it can be secured to the apparatus itself.

It is also possible to pierce only the upper foil 6, and to rely on liquid pressure to pierce the lower foil 1. In this way it is possible to increase the action of the liquid on the material contained between the foils.

In carrying out the concept of piercing only the upper foil by the teeth 10, it is also possible to weaken the lower foil 1 at spaced locations therein, or to make an entire region of the lower foil weaker than the upper foil. To do this, it is possible to replace the teeth 13 with configurations that simply leave deep marks on the lower foil but do not pierce the lower foil. The lower foil will thus be weakened but not penetrated at the locations of these marks, so as to mark the lower foil more readily penetrable under the pressure of the superposed liquid, than if the lower foil were left altogether intact.

The lower foil may also be weakened relative to the upper foil by using a thinner or otherwise inherently weaker material for the lower foil. The pressure at which the lower foil will rupture can to some extent be varied by changing the thickness or compactness of the filter material above the lower foil.

Finally, when the material contained between the foils is not a powder but rather is a liquid or an extract to be diluted, then the filter can be eliminated altogether.

These and other modifications and variations are considered to be within the purview and scope of the present invention as defined by the appended claims.

Having described my invention, I claim:

1. A method for the production of beverages by contacting a relatively small quantity of beverage-producing substance with a relatively large quantity of liquid, with said substance initially disposed in a pocket between two foils, comprising bringing together a pair of conduits into end-to-end relation with said pocket in the conduits and the foils outside said pocket establishing a gasket between said conduit ends, piercing the upper of said foils, passing said liquid in one direction through both conduits and through the pocket to contact said substance with said liquid while preventing the escape of liquid from between said conduit ends, and piercing the lower of said foils by the pressure of said liquid.

2. A method as claimed in claim 1, and piercing the upper of said foils during the step of bringing said conduit ends together, thereby to promote the passage of said liquid through said pocket.

3. A method as claimed in claim 2, and weakening said lower foil during the step of bringing said conduit ends together prior to piercing said lower foil.

4. A method as claimed in claim 1, and weakening said lower foil during the step of bringing said conduit ends together prior to piercing said lower foil.